(12) United States Patent
Leblond

(10) Patent No.: US 8,271,845 B2
(45) Date of Patent: Sep. 18, 2012

(54) METHOD FOR EVALUATING THE OPERATING SAFETY OF A SYSTEM

(75) Inventor: Andre Leblond, Versailles (FR)

(73) Assignee: Thales, Neuilly sur Seine (FR)

( * ) Notice: Subject to any disclaimer, the term of this patent is extended or adjusted under 35 U.S.C. 154(b) by 852 days.

(21) Appl. No.: 12/272,490

(22) Filed: Nov. 17, 2008

(65) Prior Publication Data

US 2009/0144599 A1 Jun. 4, 2009

(30) Foreign Application Priority Data

Nov. 16, 2007 (FR) ..................................... 07 08057

(51) Int. Cl.
*H03M 13/00* (2006.01)
(52) U.S. Cl. .............................. 714/752; 714/55; 714/71
(58) Field of Classification Search .................... 714/71, 714/55, 47, 36, 12, 752; 700/79, 18
See application file for complete search history.

(56) References Cited

U.S. PATENT DOCUMENTS

| | | | |
|---|---|---|---|
| 6,999,824 B2 * | 2/2006 | Glanzer et al. ................... | 700/18 |
| 7,167,762 B2 * | 1/2007 | Glanzer et al. ................... | 700/79 |
| 7,486,999 B2 * | 2/2009 | Glanzer et al. ................... | 700/79 |
| 7,489,977 B2 * | 2/2009 | Duffy et al. ...................... | 700/79 |

OTHER PUBLICATIONS

Castel, etal., "Analyse de exigences de surete d'un systeme electrique par model-checking" Actes du Congres Lamba-MU 14, Oct. 2004, pp. 1-6.
Seguin, etal., "Modeles formels pour l'evaluation de la surete de fonctionnement de architectures logicielles d' avionnique modulaire integree" Confrenece Approces Formelles Dans L'Assistance Au Developpement De Logiciels 2001, pp. 1-15.
Joshi, et al. "Model-Based Safety Analysis of simulink Models Using SCAD Design Verifier" Computer Safety, Reliability and Security Lecture Notes in Computer Science;LNCS, Springer-Verlag, BE, vol. 3688, 2005, pp. 122-135.
Sagaspe, et al. "Safe allocation of Avionics Shared Resources" High-Assurance Systems Engineering, 2005. Ninth IEEE International Symposium on Heidelberg, Germany 12-14, Oct. 2005.
Miura, et al. "Characterization of Operational Safety in Offshore Oil Wells" Journal of Petroleum Science and Engineering, vol. 51, No. 1-2, 2006, pp. 111-126.

* cited by examiner

*Primary Examiner* — Fritz Alphonse
(74) *Attorney, Agent, or Firm* — Stroock & Stroock & Lavan LLP

(57) ABSTRACT

Evaluating the operating safety of a complex software and or hardware system such as a system for displaying flight information on an instrument panel of an aircraft. The evaluation method includes construction of a first architecture of the system, divided into several blocks each comprising data inputs/outputs, the inputs of a block being connected to the outputs of other blocks in the first architecture; identification of failures of the outputs of the blocks of the architecture; construction of first boolean expressions expressing the states of the outputs of the blocks of the first architecture as a function of the states of the identified failures, of the states of the inputs of the blocks; definition of a first feared event to be examined by a second boolean expression constructed based on the first boolean expressions; and reduction of the second boolean expression in a sum of monomials.

15 Claims, 4 Drawing Sheets

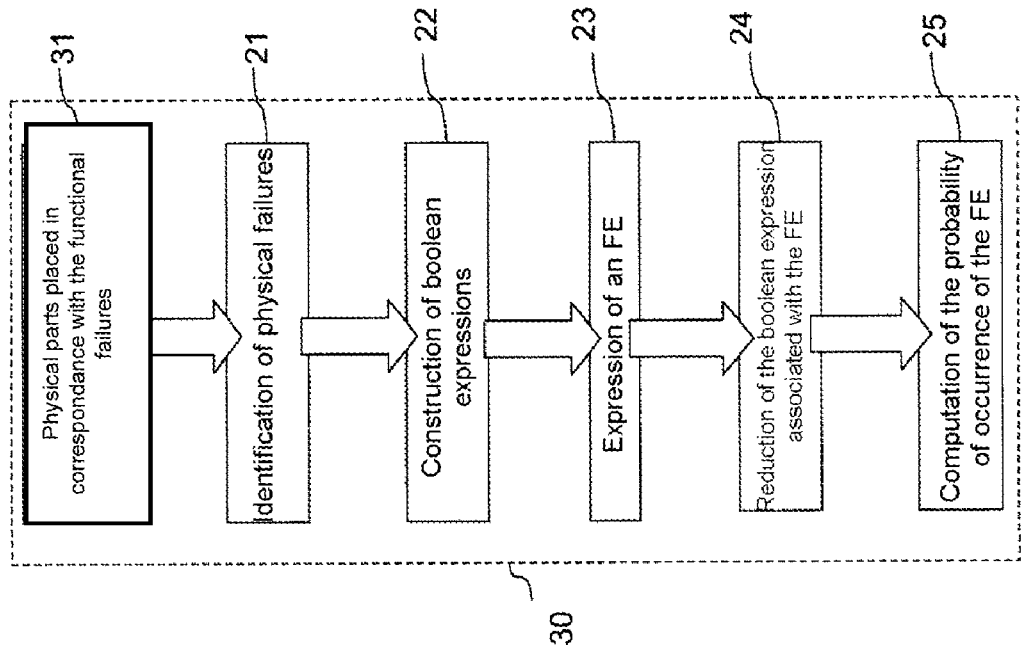

METHOD FOR EVALUATING THE OPERATING SAFETY OF A SYSTEM

This application under 35 U.S.C. §119 claims priority from French patent application No. 0708057 filed with the French Patent Office on Nov. 16, 2007, which is incorporated herein by reference in its entirety.

BACKGROUND OF THE INVENTION

The present invention relates to a method for evaluating the security of operation of a complex software and/or hardware system such as a system for displaying flight information on an instrument panel of an aircraft. A system for displaying flight information comprises notably a data processing software part and a hardware part comprising a computer, performing the processing of data, and a display screen for example.

BRIEF DESCRIPTION OF THE PRIOR ART

The security of operation of a system may be defined as being the property allowing users of the system to place justified confidence in the services that it delivers to them. A user of the system may be an individual such as an operator or a supervisor or else another hardware or software system having interactions with the system in question. Depending on the applications for which the system is intended, security of operation may be characterized according to different but complementary properties such as the reliability, availability, security, maintainability, confidentiality and integrity of the system.

Reliability corresponds notably to the continuity of the services that the system should supply to its users, in the absence of repairs. Reliability may also be defined as the ability of a system to accomplish a required function, in given conditions, for a given period. All the failures of the system of an accidental nature may be taken into account with no discrimination concerning their severity. An example of a measure of reliability is the failure rate, the inverse of the average operating time before the first failure.

The maintainability of a system is its ability to support repairs and upgrades. The maintenance of the system must therefore be accomplished in given conditions with prescribed procedures and resources. An example of the measurement of maintainability is for example the average time to repair or restore the system to a state of correct operation.

The availability of a system is the ability of a system to correctly deliver a service, in terms of time and quality, when the user has need thereof. Availability is a unitless measurement; it corresponds notably to a proportion of correct operation time over the total operation time of the system.

In terms of security, it is possible to distinguish security-harmlessness from security-confidentiality: security-harmlessness aims to provide protection against catastrophic failures, that is to say failures for which the consequences are inacceptable with respect to the risk run by the system and its users; security-confidentiality corresponds to the prevention of access or of unauthorized manipulation of information contained in the system. Security-confidentiality therefore relates to the struggle against intentional faults such as computer viruses, logic bombs, or computer Trojan horses. Security-confidentiality also relates to guaranteeing the integrity of the information supplied to the users of the system.

A system must therefore take into account the constraints relating to security of operation in order to provide the users with an expected service. The constraints of security of operation may therefore be stated in terms of reliability, security, maintainability and availability.

For a system on board an aircraft such as a flight parameter computer for example, there is particular interest in reliability, availability and security. It is notably important, or even vital, to control and reduce all the failures of such a system, so as, notably, to prevent any accident that may involve human lives.

In the production of systems such as flight parameter computers, the constraints of security of operation are often evaluated during a relatively late stage in the design and production of the system. During such a production and design phase, it is often difficult and costly to take account of the constraints of security of operation, notably if they bring into question the initial design of the system. This therefore often means that the constraints of security of operation are only imperfectly taken into account and therefore places the system in danger.

It therefore appears necessary to be able to take account of the constraints of security of operation as early as the phases of specifying the system and defining the functional architecture of the system. During these phases, called the upstream phases, a means of taking account of the constraints of security of operation is to define situations of critical malfunction of the system, potentially placing the system and/or a user in danger. An example of critical malfunction for a flight parameter display function may be an incorrect display of an altitude on an instrument panel screen, with no alarm indicating that a failure has occurred. Such a malfunction may cause a collision with the ground. The cases of critical malfunctions are called feared events. A feared event, or FE, may be broken down to its causes in order to obtain a failure tree.

A failure tree may be represented in the form of a logic diagram using a tree structure to represent failures and their combinations leading to a feared event. A reduction of the failure trees based on a computation of minimal cuts makes it possible to identify critical scenarios. A minimal cut is a combination of basic events that may lead to the feared event, such that, if an event is removed from this combination, the feared event no longer takes place. The search for minimal cuts in a failure tree is carried out based on the rules of Boole's algebra considering that:

- each basic event of the failure tree corresponds to a boolean variable;
- an event at the output of an "AND" gate of the failure tree is associated with the product of boolean variables corresponding to the input events of the "AND" gate;
- an event at the output of an "OR" gate of the failure tree is associated with the sum of boolean variables corresponding to input events.

Based on the minimal cuts, the user deduces what are the hardware and software elements of the system whose failure(s) contribute(s) most to the realization of the feared event. For example, based on the probabilities of occurrence of the basic events, it is possible, by rising in the failure tree, to compute a probability of occurrence of the feared event. A minimal cut may be:

- a single cut, that is to say comprising only one basic event also called a single fault;
- a double cut, that is to say having two basic events;
- a triple cut, that is to say having three basic events.

Other multiple cuts, that is to say having more than three basic events, exist but their probability of occurrence is usually negligible compared with the probabilities of occurrence of the single, double or triple cuts.

A quantitative constraint of security of operation is, for example, to obtain the feared event with a probability of less than $10^{-9}$ per hour of flight. Another qualitative constraint of security of operation may be that a single fault, that is to say a specific fault affecting a delimited part of the system, cannot cause a feared event. An analysis of a failure tree may make it possible during the upstream phase to promote a hardware or software architecture, amongst several architectures, in light of the probabilities of occurrence of feared events and of the existence of single cuts, for one or other of the proposed architectures.

A first step for evaluating the security of operation of a complex system is notably the translation of the specifications of the system into a model on which the analyses of security of operation are based.

A first method may be to transcribe the specifications of the system into a model having a particular formalism as proposed by the UML, MDA or MDE methods:

UML, for Unified Modeling Language, is a graphic language for the modeling of the data and the processes of a system; UML is a formalization of an object-oriented modeling used notably in software engineering;

MDA, for Model Driven Architecture, has as its basic principle an elaboration of models, independent of the type of platforms for applying the system, then the transformation of the latter into models dependent on the type of platforms for the concrete implementation of the system. The techniques employed for MDA are therefore principally techniques of meta modeling and techniques of model transformation.

MDE, for Model Driven Engineering, uses the principles of meta modeling proposed by the MDA in order to allow a capitalization of a process from the analysis down to the software code.

A first means is therefore to reduce the number of textual specifications of the system by converting them into a model according to one of the abovementioned formalisms. Generally, a formalism is all the better if it makes it possible to cover a maximum of textual specifications. Software tools using the abovementioned formalisms make it possible notably to automatically or semi-automatically generate design models for the system. Taking account of security of operation may occur by incorporating requirements relative to security of operation in the requirements of the system.

Using UML, MDA, MDE modeling to produce models suitable for security of operation is complex and requires a complete workshop of specific software tools. Such workshops exist but are currently not very suitable for taking account of informal specifications of complex systems. In addition, these tools are not suited to taking account of the constraints of security of operation. The UML, MDA, MDE approaches therefore do not make it possible satisfactorily to take account of the specifications relating to the security of operation of a system.

A second method may be an automatic generation of failure trees with the aid of specific software tools. The system is initially described in the form of a model using a formalism dependent on the software tool used. The formalism of these tools offers the flexibility required to cover the constraints and the specifications of security of operation. The software tool comprises an automatic failure tree generator whose inputs are the model described initially and the values of the failure rates. The generator then determines a comprehensive set of simple or multiple cuts relating to the feared events defined by a designer of the system, and their probability of occurrence. Such a tool therefore makes it possible to target weak points of the system in terms of security of operation. The tool also makes it possible to verify, after, if necessary, revising the system architecture, that the system holds its security of operation objectives.

These tools for automatic generation of failure trees are mainly used for physical architectures of systems. The reliability of these generation tools has not been evaluated on complex functional architectures. In addition, the automatic generation of failure trees is limited by the size of the input model. For example, too large a size causes a combinatorial explosion in the tool: the user must then divide his model into several models. The generation of the simple and multiple cuts is not in this case comprehensive.

A third method may be an extension of the formalism of the failure trees to produce dynamic trees. The tools associated with the generation of these dynamic trees use a formalism defining new types of logic gates. These new logic gates make it possible to take account of certain of the dynamic aspects of the system. The associated tools are capable of generating simple or multiple cuts relative to feared events. The tools associated with the creation of dynamic trees also make it possible to define an order of occurrence of the failures for each minimal cut with the corresponding probabilities of occurrence. This approach therefore provides, relative to the purely static approaches, a better recognition of the upstream specifications of the system in their dynamic aspects.

However, this third method still remains in an experimental field: it has not proved itself for taking account of complex systems and notably for the construction of really representative dynamic failure trees. In addition, during the generation of the minimal cuts, an over-voluminous dynamic failure tree causes a combinatorial explosion more frequently than a static failure tree. Furthermore, the extension of the formalism only very partially covers the real dynamics of a complex system.

A fourth method may be a modeling and a simulation of a functional architecture with the aid of standard tools. The architecture is modeled according to a formalism specific to the standard tool used. Simulations made by these standard tools make it possible to detect dynamic failure sequences causing feared events. It is therefore possible to reveal combinations of failures that escape the conventional static approaches. The probabilities of occurrence of the feared events are measured by long time scale simulations of the Monte Carlo type. A change in the functional architecture then results in a different measurement of the rates of occurrence of the feared events and in a change of the dynamic combinations of failures causing these feared events.

In practise, the tools available for applying the fourth method do not always lend themselves well to the modeling of failures and feared events. The construction of the model is a fairly laborious task requiring a great deal of expertise. In addition, the quantitative simulations of the Monte Carlo type last far too long if acceleration methods are not used. Such acceleration methods however cause multiple side effects and they are tricky to implement. This fourth method is mainly of value during the specification and detailed design of the system, at a moment in the cycle of producing the system when the dynamics of the system and the failures to be envisaged are well known. During the upstream phases of validating the functional architecture of the system, the fourth method cannot be applied because there are insufficient input data that must be supplied to use the fourth method. During the upstream design phases, this method is therefore too laborious and too costly to apply.

A fifth method may be a method of manual construction of failure trees by using appropriate computer tools. It involves a conventional static approach usually used for physical architectures. This fifth method may be used to describe purely functional architectures. Once a failure tree has been entered with the aid of the computer tools, the simple and multiple cuts are generated automatically as are the rates of occurrence of the feared events.

The fifth method, even though it is not very costly, cannot always be used. In addition, this fifth method produces non-comprehensive results because the failure tree contains only the combinations of failures that a security of operation expert can imagine. The complexity of a failure tree corresponding to a standard functional architecture requires that the expert in safety has an overview of the system. The failure tree quickly gets out of control because of the complexity of the functional architecture. Actually, only an expert in safety, with a perfect knowledge of the system studied, can complete the manual construction of such a failure tree with a limited risk of errors.

A sixth method consists in taking an interest in, for each block of the functional architecture of the system, the combinations of output states that can cause feared events. In practise, the user envisages, for each output of a functional block, three standard states that are:
- present and significant value;
- absent value;
- present and insignificant value.

Amongst the standard states for each output, the user identifies those which risk causing feared events. Combinations of states are then examined. It is then necessary to provide an internal architecture to the functional block so that these critical combinations cannot appear on its outputs. If it is not possible to modify the architecture of the functional block, it is desirable to install externally to the functional block monitoring mechanisms capable of detecting these critical combinations and to disable them.

However, it is scarcely possible to determine with certainty and comprehensively all the combinations of output states of each functional block causing feared events.

SUMMARY OF THE INVENTION

An object of the invention is notably to alleviate the aforementioned disadvantages by providing, for various functional and/or physical architectures of a system, criteria for evaluating and comparing a system's ability to prevent previously defined feared events.

Accordingly, the subject of the invention is a method for evaluating the operating safety of a system performing a macro function.

The method for evaluating the operating safety may notably comprise the following steps:
- construction of an architecture of the system, for example divided into several blocks each comprising data inputs/outputs, the inputs of a block being notably connected to the outputs of other blocks of the architecture;
- identification of failures associated with the blocks of the architecture, the failures being able to take a state amongst: a first active state, a second inactive state;
- construction of first boolean expressions expressing notably states of the outputs of the blocks of the architecture as a function of states of the identified failures, of states of the inputs of the blocks, said input states of the blocks being able to be reflected by at least one boolean;
- construction of one or more second boolean expressions based notably on the first boolean expressions, each second boolean expression being able to define a feared event to be examined;
- reduction of each second boolean expression in a sum of monomials;
- calculation of a first probability of occurrence for the feared event based on the sum of monomials, corresponding to the feared event, notably as a function of probabilities of occurrence of the identified failures.

The failures may be failures specific to the processes carried out by each block.

The failures may be generic failures:
- a first type of generic failure deleting an item of information at the output of a block;
- a second type of generic failure rendering insignificant an item of information at the output of a block that is supposed to be present;
- a third type of generic failure forcing an insignificant item of output information to be present when there is no information at the input of a block.

A generic failure may be expressed as a function of the specific failures identified.

An item of output or input information for example of the following type:
- continuous, a state of the output or input information may be reflected by two booleans: a first boolean expressing for example a presence of input or output information, a second boolean expressing for example an insignificant value for the information if the latter is present;
- enumerated, being able for example to take an integer number n of enumeration values, an output or input state of the enumeration information may be expressed by:
  n third booleans corresponding to n enumeration values;
  a fourth boolean expressing an insignificant enumerated value;
  a fifth boolean expressing an absence of information;
- boolean, an output or input state is defined by a sixth boolean of information presence.

The constructed architecture may be a functional architecture.

The constructed architecture may be a physical architecture.

The method may be suitable for an avionics system.

A further subject of the invention is a method for evaluating the operating safety of a system performing a macro function comprising notably the following steps:
- construction of a functional architecture of the system, notably divided into several functional blocks each comprising data inputs/outputs, the inputs of a functional block being connected to the outputs of other functional blocks of the functional architecture;
- identification of failures associated with the functional blocks of the functional architecture, the failures being able to take a state amongst: a first active state, a second inactive state;
- construction of a physical architecture notably divided into physical parts performing functions of the functional architecture;
- projection of the identified failures, associated with the functional blocks, on the physical parts;
- identification of physical failures based on the failures identified for the outputs of the functional blocks, the physical failures being able to take a state amongst: a first active state, a second inactive state;
- construction of second boolean expressions expressing notably the states of the outputs of the functional blocks as a function of the identified physical failures, the states of the inputs of the functional blocks, said input states of the blocks being able to be reflected by at least one boolean;
- construction of one or more third boolean expressions, based on the second boolean expressions, each third boolean expression being able to define a feared event to be examined;

reduction of each third boolean expression in a sum of monomials;

computation of a probability of occurrence for the feared event based notably on probabilities of occurrence of the identified physical failures.

The step of identification of physical failures comprises notably a first phase of identification of common modes, corresponding to sets of physical parts contributing notably to the activation of one and the same set of functional failures, a second phase of association of each physical failure with each identified common mode.

The failures may be failures specific to the processes carried out by each block.

The failures may be generic failures:
a first type of generic failure deleting for example an item of information at the output of a block;
a second type of generic failure for example rendering insignificant an item of information at the output of a block that is supposed to be present;
a third type of generic failure forcing for example an insignificant item of information at the output to be present when there is no information at the input of a block.

A generic failure may be expressed as a function of the specific failures identified.

An item of output or input information being for example of the following type:
continuous, a state of the output or input information is reflected by two booleans: a first boolean expressing for example a presence of input or output information, a second boolean expressing for example an insignificant value for the information;
enumerated, being able to take for example an integer number n of enumeration values, an output or input state of the enumeration information may be expressed by:
n booleans corresponding to n enumeration values;
a fourth boolean expressing an insignificant enumerated value;
a fifth boolean expressing an absence of information;
boolean, an output or input state may be defined by a sixth boolean of presence of information.

The method may be suitable for an avionics system.

Notably, the main advantages of the invention are that it is simple and not very costly to apply during the various phases of definition and development of a complex system.

BRIEF DESCRIPTION OF THE DRAWINGS

Other features and advantages of the invention will appear with the aid of the following description, given as an illustration and being nonlimiting, and made with respect to the appended drawings which represent:

FIG. 2: several possible steps of the method according to the invention applied to a functional architecture;

FIG. 3: several possible steps of the method according to the invention applied to a physical architecture;

DETAILED DESCRIPTION

Figure 1:
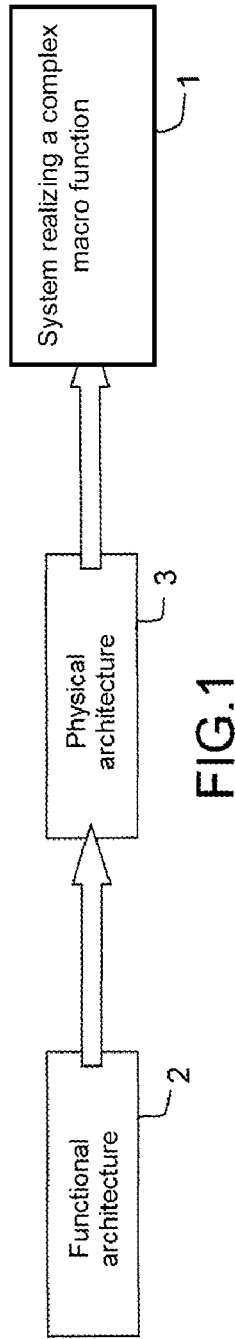
FIG. 1: an example of possible steps for producing a system.

FIG. 1 represents several possible tasks making it possible to produce a system 1 using a complex macro function. The production of the system 1 may notably comprise a first task of constructing a functional architecture 2. A functional architecture 2 is notably constructed by dividing the macro function into functional blocks of reduced size. The functional blocks thus obtained interact so as to perform the macro function.

A second task for producing the system 1 may be a projection of the functional architecture 2, originating from the first step, onto a physical architecture 3. The physical architecture 3 makes it possible to apply the macro function by an application of the functional blocks of the functional architecture 2. The physical architecture 3 may also be divided into physical blocks.

One of the objectives of the invention is to provide, for various functional and/or physical architectures, criteria for evaluating and comparing the capability of the system 1 to prevent previously defined feared events. The feared events are combinations or sets of combinations of primary output states and/or primary input states of the macro function. The primary inputs and the primary outputs are respectively the inputs and outputs of the macro function performed by the functional architecture.

It is possible to define three standard states for an input signal, an output signal or an internal signal:
presence of a value and significant value;
presence of a value and insignificant value;
absence of a value.

A failure inside a functional block or a physical block may affect the output states and/or the states of signals inside this block.

Two types of evaluation criteria may be defined: a first type of qualitative criterion and a second type of quantitative criterion.

A qualitative criterion may be: can an errored input on its own cause a feared event? Another qualitative criterion may be: is there a failure on its own causing a feared event? The existence of an errored input on its own causing a feared event or a failure on its own causing a feared event is a strong argument against a functional or physical architecture being considered.

A quantitative criterion may be a maximal probability of occurrence for each feared event. High values for these probabilities indicate a functional or physical architecture that is not optimal.

The method according to the invention may process initially a functional architecture and optionally secondly a physical architecture or a physical architecture only.

FIG. 2 represents a first processing 20 of a functional or physical architecture via several possible successive steps 21, 22, 23, 24, 25 of the method of analysis according to the invention. Input data of the method according to the invention are notably a breakdown of a macro function into functional blocks or physical parts. An example of a functional architecture and an example of a physical architecture are detailed below. In the case of a functional architecture, each functional block may be broken down into sub-blocks of smaller granularity than the functional block. The functional blocks of the level from which the breakdown into sub-blocks is stopped are for example called "basic functional blocks". The granularity may be defined as a degree of complexity of the basic functional blocks.

The description of the first processing 20 deals, for example, with the case of a functional architecture. The same steps may apply in the same manner to a physical architecture.

A first step 21 may be a step 21 of identifying functional or physical failures for the basic functional blocks. The functional failures may for example be deduced from the subfunctions of each basic functional block. It should be noted that a functional block is not explicitly associated with a subfunction.

A second step 22 may be a step 22 of constructing boolean expressions associated with each of the three standard states of the outputs of each basic functional block. For each output of each basic functional block, the three standard states may be expressed in the form of a combination, or of a set of combinations, of input states of the block and failure states identified for this block. The failure states may for example be: active or inactive. It is then possible to associate, with each of the three states of an output of a basic functional block, a boolean expression constructed on the basis of the three states of each input and the two possible states of the failures.

A third step 23 may be a step 23 of expressing an FE that it is desired to study. The FE is defined during the specification phase of the macro function. The step 23 makes it possible to express the FE in the form of a boolean expression constructed for example based on the three possible standard states for primary inputs and the two possible states for the functional failures. The primary inputs are the inputs of the macro function produced by the functional architecture.

A fourth step 24 is a step 24 of reducing the boolean expression associated with the FE to a minimal boolean expression. Amongst the three possible standard states for a primary input, two standard states are considered to be errored: the presence of a value and insignificant value and the absence of value; the third standard state, the presence of a value and significant value being a correct standard state. A minimal boolean expression is a product sum constructed from the two possible errored states of the primary inputs and from the active state, if appropriate, of the failures associated with the functional blocks. The failures in the inactive state do not appear in the minimal boolean expression. For an FE, there is therefore a comprehensive set of failure combinations and/or errored primary input states causing the FE. This set of combinations of failures makes it possible to qualitatively evaluate the functional architecture notably by allowing the identification:

of single failures causing the FE;
of single primary errored input states causing the FE.

A fifth step 25 may be an optional step 25 of computing the probability of occurrence of the FE. The computing 25 of the probability of occurrence of the FE is possible only if the user has values of probabilities of failures and probabilities associated with the errored states of the primary inputs. The probability of occurrence of an FE allows a quantitative evaluation of the operating safety of the functional or physical architecture.

The first process 20 may be pursued by the expression of a new FE by taking the first process 20 based on the third step 23. It is therefore possible to scan all the cases of FE for each functional and/or physical architecture.

In an iterative manner, when the functional and/or physical architecture is defined with a finer granularity of the breakdown into basic functional blocks of the macro function, the first process 20 may be applied to this new breakdown into basic functional blocks. Therefore, during the system development cycle, it is possible to carry out several analyses and several evaluations of the proposed functional and physical architectures.

FIG. 3 represents a second process 30 of a physical architecture associated with a functional architecture, it being assumed that the first process 20 has been carried out.

The second process 30 comprises several possible successive steps 31, 21, 22, 23, 24, 25. When a physical architecture associated with a functional architecture is known in order to produce the macro function, it is possible to jointly validate the functional architecture and the physical architecture by using the method according to the invention. The second process 30 notably takes account of a breakdown of the envisaged functional architecture into physical basic parts of smaller granularity than the basic functional blocks. The second process 30 also uses a projection of the basic functional blocks onto the basic physical parts. This then gives, for each basic functional block, a list of basic physical parts contributing to its production. The second process 30 may also take account of the values of failure rates for each physical part.

A first step 31 of the second process 30 may be a step 31 of projecting the failures identified for the basic functional blocks onto the basic physical parts. This therefore involves creating a list of the basic physical components contributing to each identified functional failure.

A second step of the second process 30 corresponds to the step 21 of the first process 20 which is a step of identifying physical failures. The physical failures may be identified by considering, for each basic physical part, a list of the associated functional failures. The physical failures are independent of one another because they correspond to basic physical parts and/or sets of basic physical parts all disjointed.

A third step of the second process 30 corresponds to the step 22 of the first process 20 which is a step of constructing the boolean expressions associated with the outputs of the basic functional blocks by using the physical failures instead of the functional failures. Therefore, each standard output state of a basic functional block is associated with a boolean expression constructed from the three possible standard states of the inputs of the basic functional block and the two possible states for each physical failure associated with the basic functional block.

A fourth step of the second process 30 corresponds to the step 23 of the first process 20 which is a step of constructing a boolean expression characterizing an FE, as a function of the three possible states of the primary inputs of the macro function and the two possible states of the physical failures.

A fifth step of the second process 30 corresponds to the step 24 of the first process 20 which is a step of reducing the boolean expression associated with the FE to a minimal boolean expression. The minimal boolean expression is obtained from the boolean expression constructed during the fourth step of the second process 30. The minimal boolean expression may be expressed in the form of a sum of products of the two possible errored states of the primary inputs and the physical failures in the active state, if appropriate. A minimal boolean expression may be obtained in an automatic manner by using a dedicated software procedure or by using a logic expression minimization engine. This then gives qualitative evaluation information of the functional and physical architectures that are: the single physical failures causing the FE and the errored single primary inputs causing the FE, if they exist. This information takes account of the common modes inserted between the functional failures during the projection of the functional architecture onto the physical architecture. A common mode is for example a set of functional failures affecting several outputs of the functional blocks at the same time.

A sixth step 25 of the second process 30 makes it possible to compute the probability of occurrence of the FE when the values of the failure rates for each physical failure and the failure rates associated with the errored states of the primary inputs are known. This probability of occurrence depends on the one hand on the functional architecture and on the other hand on the physical architecture onto which the functional architecture is projected.

The definition of a new FE may be taken into account by repeating the second process 30 from on the fourth step 23. It is therefore possible to scan all the cases of FE.

In an iterative manner, when the functional and physical architectures are defined with a finer granularity, the first process 20 and the second process 30 may be applied to this new breakdown into basic blocks. The results obtained for example in a step n of the development of the system may therefore be refined to a step n+1.

Figure 4:
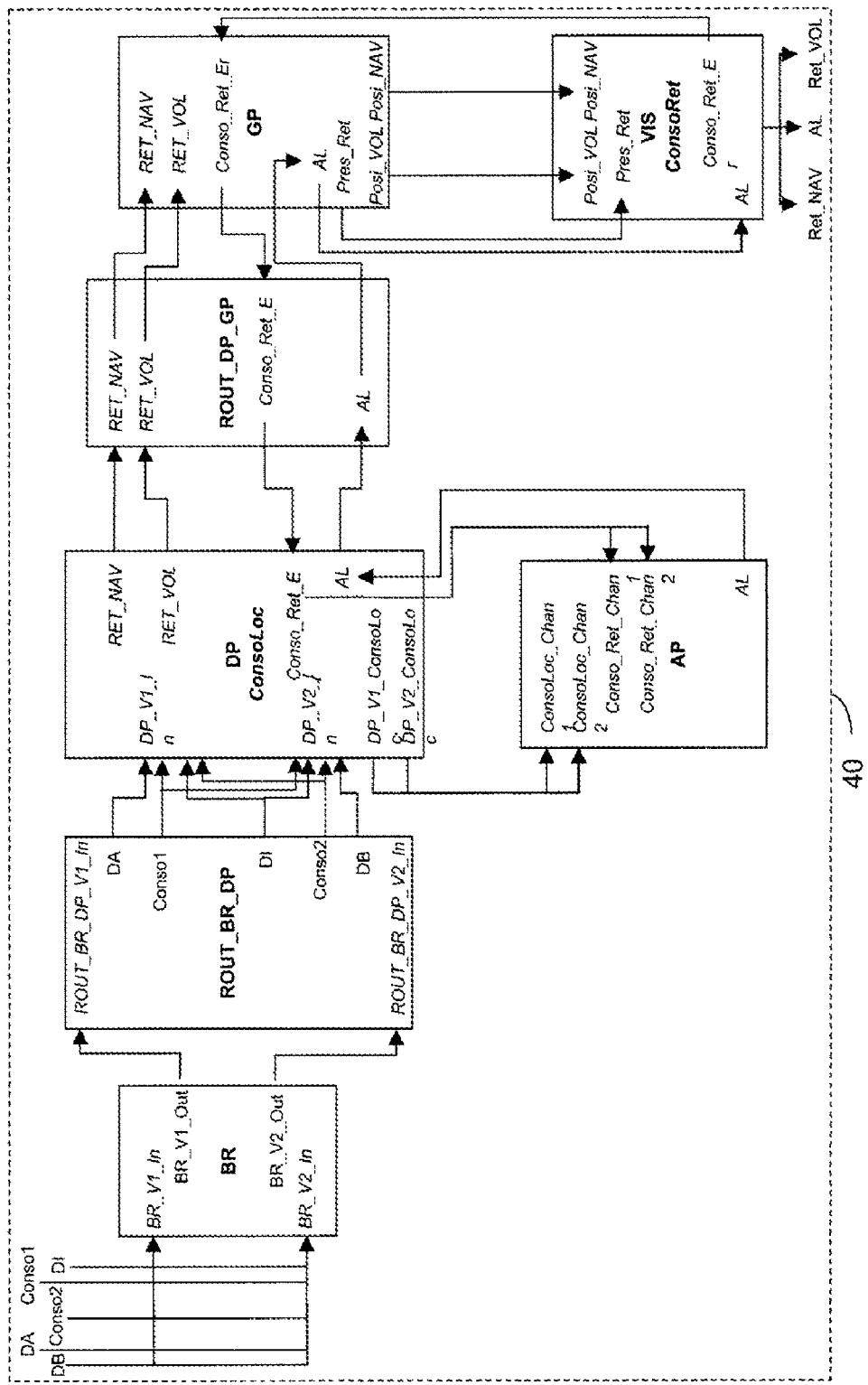
FIG. 4: an example of the breakdown into functional blocks of a first functional architecture.

FIG. 4 represents an example of a functional architecture 40. The functional architecture 40 produces a macro function for displaying flight and navigation reticules. Flight and navigation reticules are items of flight and navigation information displayed on a screen for example. An item of flight or navigation information may be a speed, an altitude, a heading.

The functional architecture 40 is divided into several basic functional blocks BR, ROUT_BR_DP, DP, ROUT_DP_GP, GP, VIS, ROUT_DP_AP, AP. The basic block ROUT_DP_AP is not represented in the figure for the purpose of legibility. Each basic functional block BR, ROUT_BR_DP, DP, ROUT_DP_GP, GP, VIS, ROUT_DP_AP, AP produces one or more subfunctions.

Primary inputs, of the functional architecture 40 represented in FIG. 4, may be:
  inertial data called DI, conso1, conso2: the inertial data DI, conso1, conso2 are redundant, that is that a consistency check called ConsoLoc makes it possible to verify the compatibility of the basic inertial data DI with the consolidation inertial data conso1, conso2.
  flight data DA and DB: the flight data DA, DB represent the same items of information, for example an altitude, but may come from different items of equipment.

Primary outputs of the functional architecture 40 shown in FIG. 4 may be:
  reticules called Ret_NAV and Ret_VOL which are respectively navigation reticules and flight reticules.
  an alarm marked AL.

The process and the routing of the information, like the primary inputs, may be carried out within the functional architecture 40 as described below.

The inertial data DI, Conso1, Conso2 and the flight data DA, DB may be presented at the input BR_V1_In, BR_V2_In of two acquisition channels V1, V2 of an acquisition functional block BR. A first input BR_V1_In corresponds for example to a first channel V1, and a second input BR_V2_In corresponds for example to a second channel V2. The inertial data DI, Conso1, Conso2 and the flight data DA, DB are acquired and transmitted to an active channel of the acquisition block BR. An active channel may be the first channel V1, the second channel V2 then being inactive: it is a case of nominal operation, that is to say a standard operation. If the first channel V1 becomes an inactive channel following a failure of the acquisition block BR, then the second channel V2 is activated: it is a case of degraded operation. The inertial data D1, conso1, conso2, DA, DB acquired by the acquisition block BR leave the acquisition block BR either via a first output BR_V1_Out, corresponding to the first channel V1 if it is active, or via a second output BR_V2_Out corresponding to the second channel V2 if it is active.

The inertial data DI, conso1, conso2 and the flight data DA, DB may then be routed to a data processing block DP by means of a first routing block ROUT_BR_DP. A routing block is a basic functional block capable of selecting input information and routing it to the correct recipients. The first routing block ROUT_BR_DP may notably select the information of an active output BR_V1_Out, BR_V2_Out of the acquisition block BR. At the output of the first routing block ROUT_BR_DP, this therefore gives the inertial data DI, conso1, conso2 and the flight data DA, DB.

The processing block DP receives on its two inputs DP_V1_In, DP_V2_In, the inertial data DI, conso1, conso2, the two channels V1 and V2 of DP being simultaneously active in a case of nominal operation. The input DP_V1_In also receives the flight data DA, the input DP_V2_In also receives the flight data DB. The processing block DP carries out on both channels V1, V2 the consistency check ConsoLoc of the inertial data DI, conso1, conso2. If there is inconsistency, an error report DP_V1_ConsoLoc, DP_V2_ConsoLoc is generated by the processing block DP on the channels V1, V2. The error reports DP_V1_ConsoLoc, DP_V2_ConsoLoc are then both transmitted to each of the inputs ConsoLoc_Chan1, ConsoLoc_Chan2 corresponding to two channels Chan1 and Chan2 of a functional block AP. Furthermore, on each channel V1, V2, the processing block DP computes the navigation and flight reticules RET_NAV, RET_VOL. The computation of the navigation reticules RET_NAV uses as input data the consolidated basic inertial data D1. The computation of the flight reticules uses first flight data DA on the first channel V1 and second flight data DB on the second channel V2. The flight reticules RET_VOL and navigation reticules RET_NAV are then transmitted to a graphic processing block GP by means of a second router ROUT_DP_GP. The graphic processing block GP also comprises two processing channels V1, V2. The navigation reticules RET_NAV and flight reticules RET_VOL are presented at the input of the two channels V1, V2 of the graphic processing block GP simultaneously active, in a case of nominal operation.

Each of the two channels V1, V2 of the graphic processing block GP computes the Cartesian coordinates Posi_NAV, Posi_VOL used for displaying the reticules received and transmits them to a viewing block VIS. The receipt, by the graphic processing block GP on its two channels, of the reticules RET_VOL and RET_NAV also makes it possible to generate a message Pres_Ret simultaneously on each of the two channels V1, V2 of the graphic processing block GP. The message Pres_Ret indicates the presence of the Cartesian coordinates Posi_NAV, Posi_VOL of the reticules RET_NAV, RET_VOL. The messages Pres_Ret are then transmitted to two channels V1 and V2 of the viewing block VIS.

When the Cartesian coordinates Posi_NAV, Posi_VOL of the reticules RET_NAV, RET_VOL are received on the two channels V1, V2 of the viewing block VIS, a consistency test ConsoRet is carried out by the viewing block VIS. If there is inconsistency, an error message Conso_Ret_Er is generated by the viewing block and broadcast over the two channels V1 and V2 of the viewing block VIS to the two channels V1, V2 of the graphic processing block GP. The display of the reticules RET_NAV, RET_VOL is carried out irrespective of the results of the consistency test ConsoRet. In a nominal case, the reticules RET_NAV, RET_VOL may be present on the first channel V1 of VIS, in this case the reticules RET_NAV, RET_VOL displayed by the viewing block VIS originate from the first channel V1 of the viewing block VIS. The reticules RET_NAV, RET_VOL displayed on the screen originate from the channel V2 of VIS if there are no reticules on the first channel V1 of the viewing block VIS, in a case of degraded operation. The messages Conso_Ret_Er originating from the two channels V1 and V2 of the viewing block VIS are then transmitted simultaneously on the two channels V1 and V2 of the processing block DP by means of the first router ROUT_DP_GP. If the first channel V1 of DP is inactive in a case of degraded operation, the message Conso_Ret_Er originating from the first channel V1 of the graphic processing block GP is presented at the input of the second channel V2 of DP. If the second channel V2 of DP is inactive in another case of degraded operation, the message Conso_Ret_Er originating from the first channel V1 of the graphic processing block GP is for example presented on the first channel V1 of DP. For these cases of degraded operation, the message Conso_Ret_Er originating from the second channel V2 of the graphic processing block GP is ignored by DP.

The messages Conso_Ret_Er received on the channels V1, V2 of the processing block DP are both presented on each of the inputs Conso_Ret_Chan1, Conso_Ret_Chan2 corresponding to the two channels Chan1 and Chan2 of the functional block AP, by means of the routing block ROUT_DP_AP not shown in FIG. 4. When the first channel Chan1 of the functional block AP is active and the second channel Chan2 of the functional block AP is inactive, in a case of nominal operation, and at least one message of the Conso_Ret_Er type or an error report ConsoLoc has been received on the first channel Chan1 of the functional block AP, then an alarm AL is generated by the functional block AP on the channel Chan1 of the functional block AP. The generated alarm AL is presented at the input of the two channels V1, V2 of the processing block DP via the third routing block ROUT_DP_AP. In a case of degraded operation where the first channel Chan1 of the functional block AP is inactive and the second channel Chan2 of the functional block AP is active, the messages Conso_Ret_Er or report ConsoLoc received on the second channel Chan2 of the functional block AP are selected. An alarm message AL originating from the second channel Chan2 of the functional block AP is then presented at the input of the two channels V1, V2 of the processing block DP via the third routing block ROUT_DP_AP.

The alarm message AL received on the two channels V1, V2 of the processing block DP is successively transmitted to the two channels V1, V2 of the graphic processing block by means of the second router ROUT_DP_GP then to the two channels V1, V2 of the viewing block VIS. The output of the alarm message AL is activated only if an alarm message AL is received on at least one of the two channels V1, V2 of the viewing block VIS.

Once the breakdown into functional blocks of the functional architecture 40 has been carried out, the various steps of the first process 20 can be run, taking for example the processing block DP.

The subfunctions associated with each channel V1, V2 of the processing block DP are notably as follows:
- receiving the data coming from the outside of the processing block DP;
- transmitting the data to the outside of the processing block DP;
- carrying out the consistency test ConsoLoc between the inertial data D1, conso1 and conso2;
- computing the navigation reticule Ret_NAV based on the basic inertial data D1;
- for the channel V1, computing the flight reticule Ret_VOL based on the flight data DA;
- for the channel V2, computing the flight reticule Ret_VOL based on the flight data DB;
- transferring the possible error message Conso_Ret_Er received at the input to the outside of the processing block DP;
- transferring the possible alarm message AL received at the input to the outside of the processing block DP.

The first step 21 of the analysis method according to the invention is the identification of the functional failures. For example, for the subfunctions associated with the first channel V1 of DP, it is possible to define the following failures:
- Corr_Rec: represents a corruption of the input data during their reception;
- Corr_Trans: represents a corruption of the data during their transmission;
- ConsoLoc_Fail: represents undetected inconsistencies;
- Ret_NAV_Comp_Fail: represents an errored computation of the navigation reticules Ret_NAV;
- Ret_VOL_Comp_Fail: represents an errored computation of the flight reticules Ret_VOL;
- ConsoRet_Comp_Fail: represents a corruption of the error message Conso_Ret_Er originating from the graphic processing block GP during its transfer to the functional block AP;
- AL_Comp_Fail: represents a corruption of the alarm message AL originating from the functional block AP during its transfer to the graphic processing block GP;
- Lost_All_Fcts: represents a loss of all the functions rendering the first channel V1 completely inactive.

The second step 22 of the method according to the invention is the step of construction of the boolean expressions associated with the output states of the processing block DP for example.

A synthetic notation is judiciously used by the analysis method according to the invention in order to construct the boolean expressions. The synthetic notation is defined by a set of notations as defined below.

For each signal like a primary input, a primary output, an internal signal, and for example for the basic inertial data DI, boolean variables DI.VAL, DI.NO and DI.VD may be introduced:
- DI.VAL=1 when the basic inertial data DI carries a value, whether the latter is significant or insignificant;
- DI.NO=¬DI.VAL=1, that is to say DI.NO is worth the opposite of DI.VAL, when the basic inertial data DI carries no value, for example when the input is absence;
- DI.FL=1 when the value carried by the basic inertial data DI is not significant;
- DI.VD=¬DI.FL=1, that is to say DI.DV is the opposite of DI.FL when the value carried by the basic inertial data DI is significant;

The notation "¬" adopted hereinafter signifies the opposite of the value that follows.

The variables DI.FL and DI.VD have no meaning unless the basic inertial data DI carries a value. In the contrary case, when DI.NO=1, the state of the variables DI.FL and DI.VD at "0" or at "1" is of no significance. In addition, DI.FL=1 and DI.VAL=1 does not mean that DI.VAL should carry another value, but that its current value is not significant. In other words, in the absence of error, the basic inertial data DI could be present or absent depending on the case and its current value, if appropriate, may very well be correct by chance. The latter case is frequent with signals taking only a reduced number of discrete states.

For each failure affecting the outputs of one or more functional blocks, the following boolean variables may be introduced: failure.A and failure.I.
- failure.A=1 when the failure is active;
- failure.I=¬failure.A=1 when the failure is inactive.

Other boolean variables may be used for expressions associated with the outputs of the functional blocks. Therefore the active and inactive states of the first channel V1 of the processing block DP may be represented by two variables noted DP:V1_Act.T and DP:V1_Act.F:

DP:V1_Act.T=1 when the channel V1 is active, in a normal case;

DP:V1_Act.F=¬DP:V1_Act.T=1 when the channel V1 is inactive, in a degraded case.

A first boolean expression may describe the value DP:V1_Ret_NAV.VAL of the navigation reticule Ret_NAV at the output of the first channel V1 of the functional block DP:

$$DP:V1\_Ret\_NAV.VAL = DP:V1\_Act.T * DP:V1\_Lost\_All\_Fcts.I * DP:V1\_DI.VAL * (DP:V1\_Corr\_Rec.I + DP:V1\_ConsoLoc\_Fail.A) \quad (100)$$

In the first boolean expression (100) and hereinafter, the term "*" represents a logic "AND" function and the term "+" a logic "OR" function. The first boolean expression (100) notably expresses the fact that the navigation reticule Ret_NAV carries a value on the first channel V1 if the first channel V1 is active and if the basic inertial data DI also carries a value. The term DP:V1_Corr_Rec.I+DP:V1_ConsoLoc_Fail.A comes from the fact that, if the basic inertial data DI are corrupted on reception, this corruption is detected by the consistency check ConsoLoc. The navigation reticule Ret_NAV is then neither computed nor transmitted unless the ConsoLoc check is itself faulty.

A second boolean expression may describe the significant aspect of the possible value carried by the navigation reticule Ret_NAV:

$$DP:V1\_Ret\_NAV.FL = DP:V1\_Corr\_Rec.A * DP:V1\_ConsoLoc\_Fail.A + DP:V1\_Ret\_NAV\_Comp\_Fail.A + DP:V1\_Corr\_Trans.A + DP:V1\_DI.FL \quad (101)$$

The second boolean expression (101) implies that DP:V1_Ret_NAV.VAL=1. The second boolean expression (101) indicates that the computed value is not significant:

- if the input inertial data DI are not significant;
- if the computation of the navigation reticule Ret_NAV is faulty;
- if the navigation reticule Ret_NAV is corrupted in transmission;
- if the received data are corrupted on reception without this corruption being detected, in which case the computed value is not significant.

A third boolean expression makes it possible to describe the value DP:V1_ConsoLoc.VAL of the error report generated by the consistency check ConsoLoc carried out by the processing block DP:

$$DP:V1\_ConsoLoc.VAL = DP:V1\_Act.T * (DP:V1\_Corr\_Rec.A + DP:V1\_DI.FL + DP:V1\_DI.NO + DP:V1\_Consol.FL + DP:V1\_Consol.NO + DP:V1\_Conso2.FL + DP:V1\_Conso2.NO) * DP:V1\_ConsoLoc\_Fail.I * DP:V1\_Lost\_All\_Fcts.I \quad (103)$$

The third boolean expression (103) giving DP:V1_ConsoLoc.VAL indicates that the error report DP_V1_ConsoLoc made by the ConsoLoc function is generated if the inertial data DI and/or the consolidation data Conso1, Conso2 presented at the input of the processing block DP are corrupted or absent or if they are corrupted on reception. In addition to these conditions, it is necessary that the consistency check ConsoLoc is not faulty, otherwise no error report DP_V1_ConsoLoc is transmitted and the first channel V1 of the processing block DP is active.

A fourth boolean expression makes it possible to describe the significant aspect of the possible value carried by the error report DP_V1_ConsoLoc:

$$DP:V1\_ConsoLoc.FL = DP:V1\_Corr\_Trans.A \quad (104)$$

The fourth boolean expression (104) giving DP:V1_ConsoLoc.FL assumes that the error report DP_V1_ConsoLoc is generated with a value, hence that DP:V1_ConsoLoc.VAL=1. If a failure called ConsoLoc_Fail is defined as causing a loss of the possible error report DP_V1_ConsoLoc, but not its corruption, only one failure noted Corr_Trans therefore remains to corrupt the error report DP_V1_ConsoLoc at the output of the processing block DP.

Different hypotheses of failures may give different boolean expressions of the boolean expressions (100), (101), (102), (103).

As an example, in the same manner as for the processing block DP, it is possible to write, for the output variables DP_DI, DP_conso1, DP_conso2, DP_V1_DA, DP_V2_DB of the first routing block ROU_BR_DP, the following boolean expressions:

$$DP\_DI.VAL = BR:V1\_Act.T * DI\_BR\_V1.VAL + BR:V2\_Act.T * DI\_BR\_V2.VAL$$

$$DP\_DI.FL = BR:V1\_Act.T * DI\_BR\_V1.FL + BR:V2\_Act.T * DI\_BR\_V2.FL$$

$$DP\_Conso1.VAL = BR:V1\_Act.T * Conso1\_BR\_V1.VAL + BR:V2\_Act.T * Conso1\_BR\_V2.VAL$$

$$DP\_Conso1.FL = BR:V1\_Act.T * Conso1\_BR\_V1.FL + BR:V2\_Act.T * Conso1\_BR\_V2.FL$$

$$DP\_Conso2.VAL = BR:V1\_Act.T * Conso2\_BR\_V1.VAL + BR:V2\_Act.T * Conso2\_BR\_V2.VAL$$

$$DP\_Conso2.FL = BR:V1\_Act.T * Conso2\_BR\_V1.FL + BR:V2\_Act.T * Conso2\_BR\_V2.FL$$

$$DP\_V1\_DA.VAL = BR:V1\_Act.T * DA\_BR\_V1.VAL + BR:V2\_Act.T * DA\_BR\_V2.VAL$$

$$DP\_V1\_DA.FL = BR:V1\_Act.T * DA\_BR\_V1.FL + BR:V2\_Act.T * DA\_BR\_V2.FL$$

$$DP\_V2\_DB.VAL = BR:V1\_Act.T * DB\_BR\_V1.VAL + BR:V2\_Act.T * DB\_BR\_V2.VAL$$

$$DP\_V2\_DB.FL = BR:V1\_Act.T * DB\_BR\_V1.FL + BR:V2\_Act.T * DB\_BR\_V2.FL$$

The boolean expressions of output variables of the first routing block ROUT_BR_DP may be completed by expressions representing the connections between the inputs and outputs of the following blocks: processing block DP, acquisition block BR and routing block ROUT_BR_DP. These expressions may be for example:

$$DP:V1\_DI.VAL = DP\_DI.VAL$$

$$DP:V1\_DI.FL = DP\_DI.FL$$

$$DP:V1\_Conso1.VAL = DP\_Conso1.VAL$$

$$DP:V1\_Conso1.FL = DP\_Conso1.FL$$

$$DP:V1\_Conso2.VAL = DP\_Conso2.VAL$$

$$DP:V1\_Conso2.FL = DP\_Conso2.FL$$

$$DP:V1\_DA.VAL = DP\_DA.VAL$$

$$DP:V1\_DA.FL = DP\_DA.FL$$

$$DP:V2\_DI.VAL = DP\_DI.VAL$$

DP:V2_DI.FL=DP_DI.FL

DP:V2_Conso1.VAL=DP_Conso1.VAL

DP:V2_Conso1.FL=DP_Conso1.FL

DP:V2_Conso2.VAL=DP_Conso2.VAL

DP:V2_Conso2.FL=DP_Conso2.FL

DP:V2_DB.VAL=DP_DB.VAL

DP:V2_DB.FL=DP_DB.FL and equally:

DI_BR_V1.VAL=BR:V1_DI.VAL

DI_BR_V1.FL=BR:V1_DI.FL

Conso1_BR_V1.VAL=BR:V1_Conso1.VAL

Conso1_BR_V1.FL=BR:V1_Conso1.FL

Conso2_BR_V1.VAL=BR:V1_Conso2.VAL

Conso2_BR_V1.FL=BR:V1_Conso2.FL

DA_BR_V1.VAL=BR:V1_DA.VAL

DA_BR_V1.FL=BR:V1_DA.FL

DB_BR_V1.VAL=BR:V1_DB.VAL

DB_BR_V1.FL=BR:V1_DB.FL

DI_BR_V2.VAL=BR:V2_DI.VAL

DI_BR_V2.FL=BR:V2_DI.FL

Conso1_BR_V2.VAL=BR:V2_Conso1.VAL

Conso1_BR_V2.FL=BR:V2_Conso1.FL

Conso2_BR_V2.VAL=BR:V2_Conso2.VAL

Conso2_BR_V2.FL=BR:V2_Conso2.FL

DA_BR_V2.VAL=BR:V2_DA.VAL

DA_BR_V2.FL=BR:V2_DA.FL

DB_BR_V2.VAL=BR:V2_DB.VAL

DB_BR_V2.FL=BR:V2_DB.FL

The third step 23 is the conversion in the form of a logic expression of the feared events. As an example, a feared event to be avoided may be a display of an errored reticule with no alarm. This event may be expressed by the following boolean condition:

(VIS:Ret_NAV.VAL*VIS:Ret_NAV.FL+VIS:
Ret_VOL.VAL*VIS:Ret_VOL.FL)*VIS:
AL.NO=1     (105)

Each of the terms involved in the expression of the boolean condition (105) is then developed with the aid of the equations established during the second step 22. Therefore the user works up one by one to the elementary terms, which are variables associated with the primary inputs and the failures of the functional architecture 40.

The fourth step 24 is the reduction of the boolean condition (105) to a minimal expression according to the boolean logic rules of simplification. Finally, the terms of the form "failure.I" are replaced by the value "1", thereby leading to additional simplifications of the boolean condition (105).

The expression finally obtained is a sum of minimal monomials, each monomial being the equivalent of a minimal cut for the failure tree equivalent to the expression of the boolean condition (105).

The algorithm used for the fourth step 24 may be, according to a conventional method, based on Binary Decision Diagrams.

A software routine implementing a method based on binary decision diagrams has for example monomials in ascending order of the number of failures in each monomial.

First monomials each comprising two failures and corresponding to double minimal cuts in the failure tree equivalent to the expression of the boolean condition (105) are for example as follows:

GP:V2_AL_Comp_Fail.A*DP:V1_Corr_Trans.A
DP:V2_AL_Comp_Fail.A*DP:V1_Corr_Trans.A
DP:V2_Corr_Trans.A*DP:V1_Corr_Trans.A
DP:V2_Lost_All_Fcts.A*DP:V1_Corr_Trans.A
DP:V2_Corr_Rec.A*DP:V1_Corr_Trans.A
GP:V2_Corr_Rec.A*DP:V1_Corr_Trans.A
GP:V2_Lost_ARINC.A*DP:V1_Corr_Trans.A Second monomials each comprise three failures and therefore corresponding to triple minimal cuts in the failure tree equivalent to the expression of the boolean condition (105):

VIS:Lost_AL.A*DP:V1_Corr_Rec.A*DP:
V1_ConsoLoc_Fail.A
AP:V1_Comp_Fail.A*DP:V1_Corr_Rec.A*DP:
V1_ConsoLoc_Fail.A
AP:V1L_Corr_Trans.A*DP:V1_Corr_Rec.A*DP:
V1_ConsoLoc_Fail.A
AP:V1_Lost_All_Fcts.A*DP:V1_Corr_Rec.A*DP:
V1_ConsoLoc_Fail
AP:V1_Corr_Rec.A*DP:V1_Corr_Rec.A*DP:
V1_ConsoLoc_Fail.A The results provided by the software routine indicate that no single failure is capable on its own of producing an FE, specifically the software routine provides only monomials comprising two or three failures in this example. This makes it possible to respond to the first criterion for evaluating the functional architecture 40: the qualitative criterion.

The fifth step 25 is the computation of the probability of occurrence of the feared event in question, if the user has the failure rates of the failures appearing in the monomials computed during the fourth step 24. However, in this step, it involves only a first evaluation, capable of varying a great deal depending on the physical architecture that may be envisaged and any common modes of failure resulting from the matching of the physical architecture and the functional architecture.

It is however possible to introduce common modes of functional failures, that is to say functional failures affecting several outputs of the functional blocks at the same time, in this stage of the analysis of the functional architecture. For example, to express the fact that the failures in data reception Corr_Rec may be common to two channels V1, V2 of the processing block DP, it is sufficient to add a boolean condition like: DP:V1_Corr_Rec.A=DP:V2_Corr_Rec.A to the set of boolean expressions obtained during the second step 22.

Figure 5:
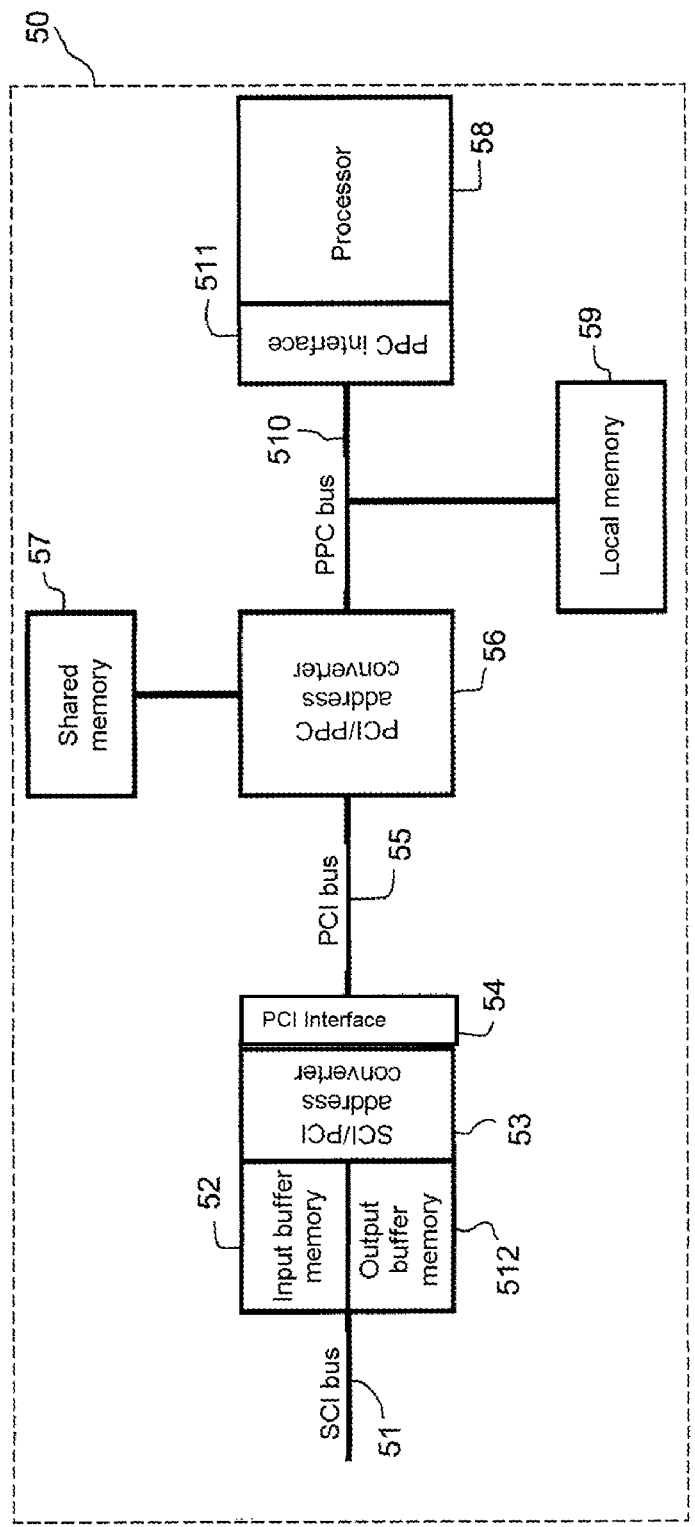
FIG. 5: an example of the breakdown into physical parts of a physical architecture.

FIG. 5 represents schematically a physical architecture of a first physical block 50 which may, for example, use the processing functional block DP for the first channel V1, the channel V2 being able to be used by a second physical block distinct from the first physical block 50. Similarly, each channel V1, V2, Chan1, Chan2 of each basic functional block, excluding routing blocks and the viewing block VIS, that is to say for the functional blocks BR, DP, GP, AP, can be projected onto a physical block of similar, but not identical, structure, to the first physical block 50 such as that shown in FIG. 5. The first physical block 50 may be divided into several physical parts 52, 53, 54, 56, 57, 58, 59, 511, 512 described below. The communication links 51, 55, 510 are also physical parts and are processed as such.

A routing of external data used by the physical block 50, across the various parts of the first physical block 50, is for example as follows:
- the external data are received on an SCI, the acronym for Serial Communication Interface, bus 51;
- the external data may then be stored in one or more input buffer memories 52;
- the external SCI addresses of the data are then converted into PCI, the acronym for Peripheral Component Interface, addresses by an SCI/PCI address converter 53;
- the external data are then transmitted on a PCI bus 55 by means of a PCI interface 54;
- the data associated with the PCI addresses originating from the SCI/PCI address converter 53 then pass through a PCI/PPC address converter 56, PPC being the acronym for Program-To-Program Communication; the PCI/PPC address converter 56 converts the addresses of the PCI data into PPC addresses;
- the data associated with the PPC addresses are then stored in a shared memory 57;
- on request from a processor 58, the data are transferred to a local memory 59 by means of a PPC bus 510;
- then, the data are received by the processor 58 by means of a PPC interface 511;
- the data received by the processor 58 are then processed by the processor 58.

Processes may then be carried out by the processor 58 in order to generate for example the flight and navigation reticules, the error reports ConsoLoc, to transfer the messages ConsoRet and the alarms AL. The physical resources used to carry out the processes are the physical parts processor 58, PPC interface 511, local memory 59 and PPC bus 510.

A data path used for a transmission of the data generated after the processes of the processor 58 may be as follows:
- the data generated by the processor 58 may pass through the PPC bus 510 and then the PCI/PPC address converter 56;
- the generated data then pass through the PCI bus 55 and the PCI interface 54 and then the SCI/PCI address converter 53;
- the generated data may be for example stored in an output buffer memory 512 before leaving the physical block 50 on the SCI bus 51.

The physical architecture performing the macro function with the aid of basic physical parts, like the physical parts represented in FIG. 5, may be analyzed by using the second process 30. One of the input data items of the second process 30 is a projection of the basic functional blocks onto the basic physical parts of smaller granularity. An example of this type of projection is described below.

The first step 31 of the second process 30 is for example a projection of the failures identified for the basic functional blocks onto the basic physical parts. This projection may be described in a first table with two inputs:
- a first input representing the functional failures identified during the first process 20 and
- a second input representing the basic physical parts performing the macro function.

An example of a first table is given below. In the first table below, a correspondence between a functional failure relative to the first channel V1 of the functional block DP and the basic physical parts forming the first channel V1 of the functional block DP is materialized by a cross in the column corresponding to the failure and on the line corresponding to the physical part. An empty box means for example that the physical part corresponding to the empty box does not contribute to the activation of the functional failure corresponding to the empty box. In the first table below, the physical parts are noted In_Buf for temporary input memory 52, Out_Buf for the temporary output memory 512, SCI/PCI_Adr_Conv for SCI/PCI address converter 53, PCI_Inter for PCI interface 54, PCI/PPC_Adr_Conv for PCI/PPC address converter 56, Shared_Mem for shared memory 57, Local_Mem for local memory 59, PPC_Interf for PPC interface 54, and PPC_Core for processor 58

|  |  | FUNCTIONAL FAILURES | | | |
|---|---|---|---|---|---|
|  |  | Corr_Rec | ConsoLoc_Fail | Ret_NAV_Comp_Fail | Ret_VOL_Comp_Fail |
| PHYSICAL BLOCKS | In_Buf | X |  |  |  |
|  | Out_Buf |  |  |  |  |
|  | SCI/PCI_Adr_Conv | X |  |  |  |
|  | PCI_Interf + Bus PCI |  |  |  |  |
|  | PCI/PPC_Adr_Conv |  |  |  |  |
|  | Shared_Mem | X |  |  |  |
|  | Local_Mem |  | X | X | X |
|  | PPC_Interf + Bus PPC |  |  |  |  |
|  | PPC_Core |  | X | X | X |

|  |  | ConsoRet_Fail | AL_Comp_Fail | Corr_Trans | Lost_All_Fcts |
|---|---|---|---|---|---|
| PHYSICAL BLOCKS | In_Buf |  |  |  |  |
|  | Out_Buf |  |  | X |  |
|  | SCI/PCI_Adr_Conv |  |  | X |  |
|  | PCI_Interf + Bus PCI |  |  |  | X |
|  | PCI/PPC_Adr_Conv |  |  |  | X |
|  | Shared_Mem |  |  |  |  |
|  | Local_Mem | X | X |  |  |
|  | PPC_Interf + Bus PPC |  |  |  | X |
|  | PPC_Core | X | X |  |  |

The second step of the process 30 is the step 21 for identifying the physical failures. The first table above shows the existence of common modes between the functional failures depending on common physical parts. The common modes correspond in this case to physical parts and/or sets of physical parts contributing to the activation of several functional failures. For example: the physical part SCI/PCI_Adr_Conv contributes notably to the activation of the two functional failures Corr_Rec and Corr_Trans. More precisely, the common modes may correspond to maximal sets of physical parts contributing to the activation of one and the same set of failures. A set of physical parts contributing only to the activation of a single functional failure may also be indicated by the term "common mode".

In the example illustrated by the first table, the sets of physical parts corresponding to common modes are for example as follows: {In_Buf, Shared_Mem}, {Out_Buf}, {SCI/PCI_Adr_Conv}, {PCI_Interf, Bus PCI, PCI/PPC_Adr_Conv, PPC_Interf, Bus PPC}, {Local_Mem, PPC_Core}.

The physical failures may for example be defined based on common modes like those identified thanks to the first table. Each physical failure may be associated with a set of physical parts corresponding to a common mode. The sets of physical parts corresponding to common modes being disjointed, the physical failures are independent from one another. A second table with two inputs may make it possible to list the physical failures and to cross-refer them with the physical parts. An example of a second table is given below.

|  |  | PHYSICAL FAILURES | | | | |
| --- | --- | --- | --- | --- | --- | --- |
|  |  | Phy_Corr_Rec | Phy_Corr_Trans | Phy_Corr_Trans/Rec | Phy_Comp_Fail | Phy_Lost_All_Fcts |
| PHYSICAL PORTIONS | In_Buf | X | | | | |
|  | Out_Buf | | X | | | |
|  | SCI/PCI_Adr_Conv | | | X | | |
|  | PCI_Interf + Bus PCI | | | | | X |
|  | PCI/PPC_Adr_Conv | | | | | X |
|  | Shared_Mem | X | | | | |
|  | Local_Mem | | | | X | |
|  | PPC_Interf + Bus PPC | | | | | X |
|  | PPC_Core | | | | X | |

In the example of the second table above, the physical failures are listed at the head of a column and the physical parts at the head of a line. The physical failures are named as an example. The physical failure Phys_Corr_Trans/Rec originates for example from a common mode between the functional failures Corr_Rec and Corr_Trans, the common mode in question being associated with the following set: {SCI/PCI_Adr_Conv}.

It is also possible to cross-refer the identified physical failures with the functional failures. This cross-referencing may be done in the form of a third table with two inputs of which an example is given below:

|  |  | PHYSICAL FAILURES | | | | |
| --- | --- | --- | --- | --- | --- | --- |
|  |  | Phy_Corr_Rec | Phy_Corr_Trans | Phy_Corr_Trans/Rec | Phy_Comp_Fail | Phy_Lost_All_Fcts |
| FUNCTIONAL FAILURES | Corr_Rec | X | | X | | |
|  | ConsoLoc_Fail | | | | X | |
|  | Ret_NAV_Comp_Fail | | | | X | |
|  | Ret_VOL_Comp_Fail | | | | X | |
|  | ConsoRet_Fail | | | | X | |
|  | AL_Comp_Fail | | | | X | |
|  | Corr_Trans | | X | x | | |
|  | Lost_All_Fcts | | | | | X |

A cross in a box indicates a correspondence between a physical failure indicated at the head of the column of the box containing the cross and a functional failure marked at the head of the line of the box containing the cross.

During this second step 21, the failure rates associated with the physical failures may be computed. A physical failure rate is the sum of the failure rates of the physical parts associated therewith. The failure rates of the physical parts are determined with the aid of conventional methods for evaluating the reliability of physical components.

The third step of the second process 30 is the step 22 of constructing boolean expressions associated with the outputs of the functional blocks by using the physical failures. The boolean expressions may be for example of the following type:

```
DP:V1_Ret_NAV.VAL=DP:V1_Act.T*DP:
    V1_Phy_Lost_All_Fcts.I*DP:V1_DI.VAL*(DP:
    V1_Phy_Corr_Rec.I*DP:V1_Phy_Corr_Trans/
    Rec.I+DP:V1_Phy_Comp_Fail.A)

DP:V1_Ret_NAV.FL=DP:V1_Phy_Corr_Rec.A+DP:
    V1_Phy_Corr_Trans/Rec.A+DP:
    V1_Phy_Comp_Fail.A+DP:
    V1_Phy_Corr_Trans.A+DP:
    V1_Phy_Corr_Trans/Rec.A+DP:V1_DI.FL DP:V1_ConsoLoc.VAL=DP:V1_Act.T*(DP:
    V1_Phy_Corr_Rec.A+DP:V1_Phy_Corr_Trans/
    Rec.A+DP:V1_DI.FL+DP:V1_DI.NO+DP:
    V1_Conso1.FL+DP:V1_Conso1.NO+DP:
    V1_Conso2.FL+DP:V1_Conso2.NO)*DP:
    V1_Phy_Comp_Fail.I*DP:
    V1_Phy_Lost_All_Fcts.I DP:V1_ConsoLoc.FL=DP:V1_Phy_Corr_Trans.A+
    DP:V1_Phy_Corr_Trans/Rec.A
```

The fourth step of the second process 30 is the step 23 of constructing a boolean expression for an FE. This fourth step is carried out in the same manner as described for the functional architecture. The failures taken into account are the physical failures and no longer the functional failures in the constructed boolean expression.

The fifth step of the second process 30 is the step 24 of reducing the boolean expression associated with the FE to a minimal boolean expression. The fifth step is carried out in the same manner as described for the functional architecture.

The sixth step of the second process 30 makes it possible to compute the probability of occurrence of the FE defined during the fourth step. The failure rates of the physical failures being known, the computation of the probability of occurrence of the feared event takes account of the common modes identified between functional failures.

Figure 6:
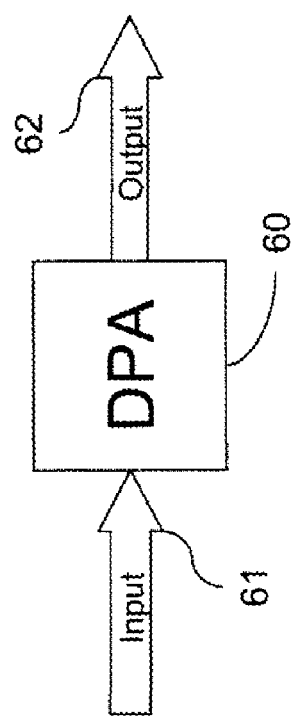
FIG. 6: an example of a functional block of a second functional architecture.

FIG. 6 represents a DPA functional block 60 taking as an input a first signal called Input 61 and supplying at the output a second signal called Output 62.

The input signal input 61 and output signal output 62 carry data that may be of three types: a first continuous type, a second enumerated type and a third boolean type:

For the data of the continuous type: the information carried by the signal is either present or absent. If it is present, it may be significant or not. Its exact value is of no importance for the writing of the logic equations giving the state of the outputs as functions of the states of the inputs and the failures.

For data of the enumerated type: the information carried by the signal is present or absent. If it is present, it may be significant or not, the possible values are of the enumerated type for example: V1, V2, V3 and may be involved in the logic equations.

For data of the boolean type: the information does not carry any value. All that is of importance is the fact that it is present or absent. It involves a particular case of the enumerated type in which V1, V2, V3 are reduced to a single value for example "VAL" which means the presence of information.

For a signal of the continuous type, it is possible to define three generic states for the information carried by the signal:
OK for significant value;
NO for absence of information;
KO for insignificant value.

The three generic states for the information carried by the signal may be expressed as a function of two states of the information and of the two states of the value of the information when the latter is present:

VAL represents a presence of information and NO=¬VAL represents an absence of information;
FL represents an insignificant value for the information, VD=¬FL represents a significant value for the information, when the information is present.

It is therefore possible to define the following booleans corresponding to the states of the Input signal when the latter is continuous: Input.VAL, Input.NO, Input.VD, Input.FL. In summary, it is possible to note:

For a significant input: Input.OK=Input.VAL*Input.VD;
For an insignificant input: Input.KO=Input.VAL*Input.FL;
For an absent input: Input.NO.

Generic failures named for example "Loss", "Misl" and "Untim" associated with the outputs of the functional or physical blocks may be defined. A generic failure of a functional or physical block may be defined independently of the functions used by the functional or physical block. The generic failures may be used systematically for the writing of the logic boolean equations associated with the basic functional blocks. If a block comprises several outputs noted Output1, Output2, the generic failures at the output of the block are for example marked: Loss_Output1, Misl_Output1, Untim_Output1, Loss_Output2, Misl_Output2, Untim_Output2.

A first generic failure marked for example "Loss" deletes the information that may be carried by the Output signal 62.

A second generic failure marked for example "Misl" corrupts, that is to say renders insignificant, the information that may be carried by the Output signal 62.

A third generic failure marked for example "Untim" forces the presence of an item of information on the Output signal 62, even if the Input signal 61 carries no information. This untimely information on the Output signal 62 is, unless there is a contrary convention, not significant.

A failure called for example "Fail" may have two states: active or inactive. It is therefore possible to associate therewith two booleans marked: Fail.A meaning failure "Fail" active and Fail.I meaning failure Fail inactive.

This then gives Fail.A=¬Fail.I which makes it possible to mark for example:
Fail.A=1 and Fail.I=0 if Fail is active
Fail.A=0 and Fail.I=1 if Fail is inactive The generic failures "Loss", "Misl" and "Untim" are notably exclusive of one another, that is to say that:
Loss.A*Misl.A=0;
Loss.A*Untim.A=0;
Untim.A*Misl.A=0.

For example, by using the notations defined above it is possible to define the logic boolean equations of the Output signal 62 by assuming that the Input signal 61 and the Output signal 62 are both continuous.

Knowing that:
the first generic failure "Loss" produces "NO" and therefore deletes the information at the output irrespective of the input,
the second generic failure "Misl" produces "FL" and therefore corrupts the information at the output when the latter is present,
the third generic failure "Untim" produces "VAL" and "FL" irrespective of the input, that is to say an output of insignificant value, and that Input.VAL=¬Input.NO, this therefore gives:

Output.VAL=Input.VAL*Loss.I+Untim.A

Output.FL=Input.FL+Misl.A+Untim.A

The writing of the Output.FL equation implies that the value of the Output signal 62 is present, that is to say that Output.VAL=1. This assumption makes it possible to write an equation as simple as possible for Output. FL.

This also gives Output.NO=~Output.VAL; Output.VD=~Output.FL

The three generic states of Output 62 are found thanks to the following expressions:

significant output:
Output.OK=Output.VAL*Output.VD insignificant output:
Output.KO=Output.VAL*Output.FL absent output: Output.NO In a general manner, the formalism described above makes it possible to write the set of equations for the functional or physical blocks in a more compact manner than if the three standard states signal.OK, signal.KO, signal.NO were used for the signals. For example, a constructed failure tree may comprise eighty events when the notation OK, KO, NO is used. It comprises only sixty-two when using the notation FL, VD, VAL, NO, the minimal cuts being strictly identical for both notations.

For a signal of the enumerated type, it is possible to define for example several states for the information:
  first states corresponding to the values taken by the enumerated element, for example: V1, V2, V3 may be three significant enumerated values, and therefore give three states of significant value,
  a KO state when the enumerated values V1, V2 or V3 are insignificant,
  and an NO state when there is no information.

Booleans Signal.V1, Signal.V2, Signal.V3, Signal.KO, Signal.NO may therefore for example be associated with a signal of the enumerated type.

For simplification, it is assumed that the information items Input 61 and Output 62 are both of the enumerated type with the same enumeration values V1, V2 and V3. The logic equations for Output 62 are for example as follows:

Output.V1=Input.V1*Loss.I*Misl.I*Untim.I

Output.V2=Input.V2*Loss.I*Misl.I*Untim.I

Output.V3=Input.V3*Loss.I*Misl.I*Untim.I

Output.KO=(Input.V1+Input.V2+Input.V3)*Misl.A+Input.KO*Loss.I+Untim.A

Output.NO=Input.NO*Untim.I+Loss.A

For a signal carrying an item of information of the boolean type, two states can be defined for the information:
  a first state VAL for the presence of information,
  a second state NO=~VAL for the absence of information.
An example of a boolean signal may be an alarm or a reset.

The following booleans may for example be associated with a signal of the enumerated type:
  Signal.VAL,
  Signal.NO
where Signal.VAL=¬Signal.NO.

This therefore amounts to using only one boolean, Signal.VAL to characterize the state of an item of information of the boolean type.

For a signal comprising an item of information of the boolean type, the generic failures to be considered are "Loss" and "Untim" which are in fact associated with the states "NO" and "VAL".

The logic equations for Output 62 in this case are as follows:

Output.VAL=Input.VAL*Loss.I+Untim.A

Output.NO=¬Output.VAL=Input.NO*Untim.I+Loss.A

To represent reconfigurable logics, that is to say functions whose behavior and therefore the associated logic equations depend on states internal to the function, it is possible to use global variables or parameters. In the case of a boolean parameter Param, two booleans Param.T and Param.F where Param.F=¬Param.T correspond to the two possible states. Clearly nothing prevents the introduction of more general parameters, of the enumerated type notably.

Figure 7:
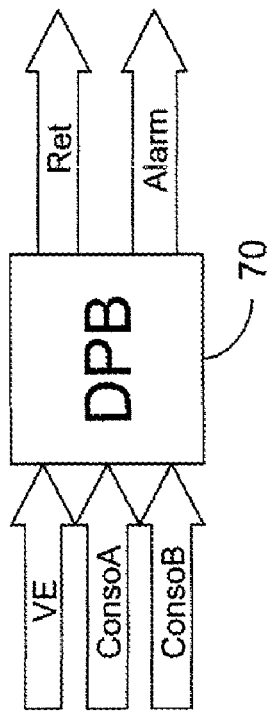
FIG. 7: another example of a functional block of a third functional architecture.

FIG. 7 represents another example of a functional block DPB 70 taking as an input:
  a state vector VE which can be for example a set of data originating from inertial units,
  items of information of consolidation of the data of vector VE, ConsoA and ConsoB which are, in normal operation, consistent with the vector VE.

The functional block DPB 70 may comprise the following outputs:
  a reticule Ret computed for example based on the vector VE,
  an alarm Alarm activated when the inputs VE, consoA, consoB are not consistent or if one of them is absent.

The generic failures Loss, Misl and Untim are associated with the outputs of the functional block DPB 70. The logic equations giving the states of the outputs of the functional block DPB 70 are as follows:

Ret.VAL=VE.VAL*Loss_Ret.I+Untim_Ret.A

Ret.FL=VE.FL+Misl_Ret.A+Untim_Ret.A

Alarm.VAL=(VE.FL+VE.NO+Conso1.FL+Conso1.NO+Conso2.FL+Conso2.NO)*Loss_Alarm.I+Untim_Alarm.A    (106)

It is now assumed that the subfunctions of the functional block DPB are known. They comprise notably:
  a first reception subfunction Rec, which receives from the outside the inputs VE, Conso1 and Conso2;
  a second transmission subfunction Trans, which transmits to the outside the transmitted information Ret and Alarm;
  a third subfunction Ret, which computes the reticule based on the state vector VE;
  a fourth subfunction "Check", which checks the consistency between VE, Conso1 and Conso2. In the event of inconsistency detected by the subfunction "Check", an alarm "Alarm" is generated by the subfunction "Check" and the reticule "Ret" is not computed.

Based on the definition of the subfunctions, it is possible to consider the following specific functional failures:
  Rec_Fail causing the corruption of the information received VE, Conso1 and Conso2;
  Trans_Fail causing the corruption of the reticule Ret and the loss of the possible alarm Alarm;
  Proc_Fail causing simultaneously the corruption of the computed reticule Ret and the loss of the possible alarm Alarm;

Ret_Fail causing the corruption of the computed reticule Ret;

Check_Fail causing the loss of the consistency check between VE, Conso1 and Conso2;

an additional failure Complete_Loss is identified, causing the complete loss of the subfunctions, that is to say the loss of the reticule Ret and of the possible alarm Alarm.

It should be noted that the failures called functional failures are considered to be specific failures and are not generic functional failures. The specific failures are particular to the types of process carried out by the functional or physical blocks.

Here are the equations giving the states of the outputs of the functional block DPB as a function of the states of the inputs of the functional block DPB and of the specific functional failures defined thus:

$$Ret.VAL=VE.VAL*Complete\_Loss.I*(Rec\_Fail.I+Check\_Fail.A)$$

$$Ret.FL=VE.FL+Rec\_Fail.A*Check\_Fail.A+Proc\_Fail.A+Ret\_Fail.A+Trans\_Fail.A$$

$$Alarm.VAL=(VE.FL+VE.NO+Conso1.FL+Conso1.NO+Conso2.FL+Conso2.NO+Rec\_Fail.A)\\ *Proc\_Fail.I*Check\_Fail.I*Trans\_Fail.I*Complete\_Loss.I \quad (107)$$

It should be noted that:

For Ret.VAL: the term (Rec_Fail.I+Check_Fail.A) expresses that if the reception subfunction Rec is not faulty, or else if Rec is faulty but the subfunction Check detecting this failure is itself faulty, the reticule is generated.

For Ret.FL: the term Rec_Fail.A*Check_Fail.A expresses that, if the reception subfunction Ret and the check Check are both faulty, the generated reticule will be corrupted.

For Alarm.VAL: all the causes that can bring about an inconsistency appear in the sum; the alarm is effectively generated if all the failures appearing in the product are inactive.

The example given is relatively simple, but the formalism presented is suitable for more complex failure logics.

It is possible then to state the generic functional failures as specific functional failures as defined above.

By placing the two sets of equations (106), (107) facing one another, it is possible to establish the following correspondences:

$$Loss\_Ret.I=Complete\_Loss.I*(Rec\_Fail.I+Check\_Fail.A)$$

$$Untim\_Ret.A=0$$

$$Misl\_Ret.A=Rec\_Fail.A*Check\_Fail.A+Proc\_Fail.A+Ret\_Fail.A+Trans\_Fail.A$$

$$Loss\_Alarm.I=Proc\_Fail.I*Check\_Fail.I*Trans\_Fail.I*Complete\_Loss.I$$

$$Untim\_Alarm.A=Rec\_Fail.A*Proc\_Fail.I*Check\_Fail.I*Trans\_Fail.I*Complete\_Loss.I \quad (108)$$

The formalism using the generic functional failures is sufficiently powerful to give account of the fine functional features of a functional block. In addition, a traceability between logic equations of the generic functional level and logic equations of the detailed functional level may be established thanks to the defined formalism. This point is of all the more value because the setting up of such a generic functional traceability versus specific functional traceability is a major problem in the design of complex systems that is currently poorly solved.

In practise, most of the time, the comparison between sets of equations makes it possible directly to express the generic functional failures in terms of detailed functional failures. In certain cases of complex failure logics, the user may be required to rework the generic equations in order to establish the correspondence. Such cases are not very frequent and the required modifications are very small.

It is then possible to define common modes between generic functional failures: the equations expressing the generic failures in terms of detailed failures effectively comprise common terms:

Loss_Ret.A and Misl_Ret.A: common term Rec_Fail.A

Loss_Ret.A and Loss_Alarm.A: common term Complete_Loss.A

Loss_Ret.A and Untim_Alarm.A: common term Rec_Fail.A

Misl_Ret.A and Loss_Alarm.A: common terms Check_Fail.A, Proc_Fail.A, Trans_Fail.A Misl_Ret.A and Untim_Alarm.A: common term Rec_Fail.A.

Each of these common terms represents a common mode between the generic failures concerned. The stating of the generic failures as detailed failures in fact gives more information and notably the exact conditions in which these common modes may become active and cause two or more generic failures simultaneously.

Stating the generic failures in terms of physical failures by means of equations connecting these terms therefore makes it possible to identify on the one hand the common modes between generic failures, on the other hand their activation logic.

The transition from a functional architecture to a physical architecture may therefore be made in three different ways.

A first way of moving from a functional architecture to a physical architecture may be as follows: generic functional failures are associated with the outputs of the basic functional blocks of the functional architecture. Then the generic functional failures are projected onto physical parts of the physical architecture.

A second way of moving from a functional architecture to a physical architecture may be as follows: for each functional block of the functional architecture, specific functional failures are defined as being based on all the subfunctions produced by the functional block. The subfunctions may be listed; they represent a final level of division of the functional block. The specific functional failures are then projected onto the physical parts of the physical architecture.

A third way of moving from a functional architecture to a physical architecture may be as follows: generic failures relating to outputs of the functional blocks of the functional architecture are defined initially. Then, specific functional failures. Then a boolean expression whose terms are specific failures expresses each generic failure. The sets of equations (108) deduced from the comparison of the sets of equations (106) and (107) illustrate the expression of the generic functional failures as a function of the specific functional failures. Then the specific failures are projected onto the physical parts of the physical architecture.

A modeling of the logic of routing information between functional blocks may also be carried out by using the formalism described.

It is possible, for example, to consider two functional blocks DP1 and DP2 identical to the block DPB, and two other functional blocks GP1 and GP2.

The states of correct operation of the blocks DP1, DP2, GP1, GP2 are represented by the state variables DP1:Act.T, DP2:Act.T, GP1:Act.T and GP2:Act.T respectively. DP1: Act.T=1, DP2:Act.T=1, mean DP1, DP2 are active.

In a nominal operation, there is DP1:Act.T=DP2: Act.T=GP1:Act.T=GP2:Act.T=1. The reticules DP1:Ret and DP2:Ret originating from DP1 and DP2 are transmitted to GP1 and GP2 respectively. Similarly, the possible error reports GP1:Err and GP2:Err originating from GP1 and GP2 are transmitted to DP1 and DP2 respectively.

If DP1 is faulty, DP1:Act.T=0, that is to say DP1:Act.F=1, the reticules DP2:Ret originating from DP2 are transmitted to GP1 and not to GP2 which no longer receives anything as an input. Similarly, the reports GP1:Err are transmitted to DP2, the reports GP2:Err originating from GP2 being ignored.

If DP2 is faulty, DP2:Act.T=0, the reticules DP1:Ret originating from DP1 continue to be transmitted to GP1, GP2 no longer receiving anything as an input. The error reports GP1: Err originating from GP1 are transmitted to DP1, those transmitted by GP2 being ignored.

If GP1 is faulty GP1:Act.T=0, the reticules DP1:Ret originating from DP1 are ignored, the reticules DP2:Ret continuing to be transmitted to GP2. The error reports GP2:Err are transmitted to DP2, DP1 no longer receiving anything as an input.

If GP2 is faulty GP2:Act.T=0, the reticules DP2:Ret originating from DP2 are ignored, the reticules DP1:Ret continuing to be transmitted to GP1. The error reports GP1:Err are transmitted to DP1, DP2 no longer receiving anything as an input.

This example of logic of routing information may be represented by the following equations:

GP1:Ret.VAL=DP1:Act.T*DP1:Ret.VAL+DP1: Act.F*DP2:Act.T*DP2:Ret.VAL

GP1:Ret.FL=DP1:Act.T*DP1:Ret.FL+DP1: Act.F*DP2:Act.T*DP2:Ret.FL

GP2:Ret.VAL=DP1:Act.T*DP2:Act.T*DP2:Ret.VAL

GP2:Ret.FL=DP1:Act.T*DP2:Act.T*DP2:Ret.FL

DP1:Err.VAL=DP1:Act.T*GP1:Act.T*GP1:Err.VAL

DP1:Err.FL=DP1:Act.T*GP1:Act.T*GP1:Err.FL

DP2:Err.VAL=DP1:Act.T*GP2:Act.T*GP2:Err.VAL+ DP1:Act.F*GP1:Act.T*GP1:Err.VAL

DP2:Err.FL=DP1:Act.T*GP2:Act.T*GP2:Err.FL+ DP1:Act.F*GP1:Act.T*GP1:Err.FL

The introduction of parameters into the equations is a very powerful means of representing reconfigurable logics.

ADVANTAGES

Advantageously, the invention makes it possible, at the functional definition phase of a complex system and in the following phases, to eliminate a functional or physical architecture that is insufficiently robust from the point of view of safety.

The method of evaluating the operating safety of a system is advantageously based on a construction of failure trees. The analyses of safety by the use of a failure tree are recognized by various operational systems certification authorities.

The input data, expressed in the form of boolean expressions, are supplied at local level, that is to say at the level of the functional or physical blocks. The user may then advantageously dispense with having an overview of the system because the additional information that he still has to supply essentially concerns the connection between the blocks. The degree of complexity of a system to be analyzed, authorized by the approach of the method according to the invention, advantageously does not depend on the ability of the user to understand everything, but lies in the power of the minimization engine. This therefore makes it possible to understand particularly complex functional and physical architectures.

Furthermore, the automatic generation of the combinations is advantageously correct and comprehensive because the input data, the failure definitions data and the logic expressions data supplied by the designer are precise and correct.

Another advantage of the invention is that the input data for a specific set of basic blocks and of failures are supplied once and for all. They are valid for any type of feared event FE.

The feared events conventionally studied are the events that are feared for security. The method according to the invention may advantageously be used with other types of events, for different purposes, notably for the establishment of failure tolerance mechanisms.

The descriptive power of the boolean expressions associated with the output states of basic blocks is very great. Finally, the descriptive power depends to a large extent on the possibility of using the NOT operator. The presence of this operator in no way affects the proposed approach. On the contrary, its use in a tree constructed manually or automatically greatly hampers the tools and may falsify the results.

The descriptive power of the notation PR, NO, VD, FL, which advantageously replaces the conventional notation OK, KO, NO for the continuous signals, makes it possible to simplify the logic equations associated with the blocks. This finally makes it possible to obtain a failure tree that is markedly less voluminous and therefore more easy to manipulate.

The invention allows an expert in safety a flexible transition, by maintaining a consistency, from analyses relating to the functional architecture to analyses relating to the physical architecture. The logic equations based on the physical failures are deduced, specifically, from the equations based on the functional failures. To do this, the invention proposes a method for identifying the physical failures based on the information of the functional failures and of the physical architecture.

The invention claimed is:

1. A method for evaluating the operating safety of a system performing a macro function, comprising the following steps:
   constructing a constructed architecture of the system, divided into a plurality of blocks each comprising data inputs/outputs, the inputs of a block being connected to the outputs of other blocks of the architecture;
   identifying failures associated with the blocks of the architecture, the identified failures taking a state selected from a group comprising a first active state, and a second inactive state;
   constructing first boolean expressions expressing states of the outputs of the blocks of the architecture as a function of states of the identified failures, and of states of the inputs of the blocks, said input states of the blocks being reflected by at least one boolean;
   constructing one or more second boolean expressions based on the first boolean expressions, each second boolean expression defining a feared event to be examined;
   reducing each second boolean expression in a sum of monomials;
   calculating a first probability of occurrence for the feared event based on the sum of monomials, corresponding to the feared event, as a function of probabilities of occurrence of the identified failures; and changing the constructed architecture of the system in response to the first probability of occurrence of the feared event exceeding a predetermined threshold.

2. The method as claimed in claim 1, wherein the failures are failures specific to the processes carried out by each block.

3. The method as claimed in claim 1, wherein the failures are generic failures selected from a group consisting of a first type, a second type and a third type, wherein:
the first type of generic failure deletes an item of information at the output of the block;
the second type of generic failure renders insignificant an item of information at the output of the block that is supposed to be present;
the third type of generic failure forces an insignificant item of output information to be present when there is no information at the input of the block.

4. The method as claimed in claim 3, wherein the generic failure is expressed as a function of the specific failures identified.

5. The method as claimed in claim 1, wherein an item of information at the output or the input is a type selected from a group consisting of continuous, enumerated and boolean, wherein:
the continuous type comprises a state of the output or input information comprising: a first boolean expressing a presence of input or output information; and a second boolean expressing an insignificant value for the input or output information if the input or output information is present;
the enumerated type comprises an integer number n of enumeration values, wherein an output or input state of the enumeration information is expressed by:
n third booleans corresponding to n enumeration values;
a fourth boolean expressing an insignificant enumerated value; and
a fifth boolean expressing an absence of information; and
the boolean type comprises an output or input state defined by a sixth boolean of information presence.

6. The method as claimed in claim 1, wherein the constructed architecture is a functional architecture.

7. The method as claimed in claim 1, wherein the constructed architecture is a physical architecture.

8. The method of claim 1, wherein the method is suitable for an avionics system.

9. A method for evaluating the operating safety of a system performing a macro function, comprising the following steps:
constructing a functional architecture of the system, divided into several functional blocks each comprising data inputs/outputs, the inputs of a functional block being connected to the outputs of other functional blocks of the functional architecture;
identifying failures associated with the functional blocks of the functional architecture, the identified failures taking a state selected from a group comprising a first active state, and a second inactive state;
constructing a physical architecture divided into physical parts performing functions of the functional architecture;
projecting the identified failures, associated with the functional blocks, on the physical parts;
identifying physical failures based on the failures identified for the outputs of the functional blocks, the physical failures taking a state selected from a group consisting of a first active state, and a second inactive state;
constructing second boolean expressions expressing the states of the outputs of the functional blocks as a function of the identified physical failures, the states of the inputs of the functional blocks, said input states of the blocks being reflected by at least one boolean;
constructing one or more third boolean expressions, based on the second boolean expressions, each third boolean expression defining a feared event to be examined;
reducing each third boolean expression in a sum of monomials;
computing a probability of occurrence for the feared event based on probabilities of occurrence of the identified physical failures; and
changing the functional architecture of the system in response to the first probability of occurrence of the feared event exceeding a predetermined threshold.

10. The method as claimed in claim 9, wherein the step of identification of physical failures comprises a first phase of identification of common modes, corresponding to sets of physical parts contributing to the activation of one and the same set of functional failures, and a second phase of association of each physical failure with each identified common mode.

11. The method as claimed in claim 9, wherein the failures are failures specific to the processes performed by each block.

12. The method as claimed in claims 9, wherein the failures are generic failures selected from a group consisting of a first type, a second type and a third type, wherein:
the first type of generic failure deletes an item of information at the output of the block;
the second type of generic failure renders insignificant an item of information at the output of the block that is supposed to be present;
the third type of generic failure forces an insignificant item of information at the output to be present when there is no information at the input of the block.

13. The method as claimed in claim 12, wherein the generic failure is expressed as a function of the identified specific failures.

14. The method as claimed in claim 9, wherein an item of output or input information is a type selected from a group consisting of continuous, enumerated and boolean, wherein:
the continuous type comprises a state of the output or input information comprising: a first boolean expressing a presence of input or output information; and a second boolean expressing an insignificant value for the input or output information;
the enumerated type comprises an integer number n of enumeration values, wherein an output or input state of the enumeration information is expressed by:
n booleans corresponding to n enumeration values;
a fourth boolean expressing an insignificant enumerated value; and
a fifth boolean expressing an absence of information; and
the boolean type comprises an output or input state defined by a sixth boolean of presence of information.

15. The method as claimed in claim 9, wherein the method is suitable for an avionics system.

* * * * *